United States Patent
Leland et al.

(10) Patent No.: US 7,128,334 B2
(45) Date of Patent: Oct. 31, 2006

(54) ULTRASONIC BLADE DESIGN FOR SCORING DOUBLE ANGLE GROOVE AND PRODUCTS THEREFROM

(75) Inventors: Richard L. Leland, South Berwick, ME (US); Gary Fussell, Chesapeake, VA (US)

(73) Assignee: Collins & Aikman Products Co., Southfield, MI (US)

( * ) Notice: Subject to any disclaimer, the term of this patent is extended or adjusted under 35 U.S.C. 154(b) by 273 days.

(21) Appl. No.: 10/664,829

(22) Filed: Sep. 17, 2003
(Under 37 CFR 1.47)

(65) Prior Publication Data

US 2004/0232669 A1 Nov. 25, 2004

Related U.S. Application Data

(63) Continuation of application No. PCT/US03/29195, filed on Sep. 17, 2003.

(60) Provisional application No. 60/411,458, filed on Sep. 17, 2002.

(51) Int. Cl.
*B60R 21/205* (2006.01)
(52) U.S. Cl. .................... 280/728.3; 280/732
(58) Field of Classification Search ............ 280/728.3, 280/731, 732; 83/875, 879; 428/156
See application file for complete search history.

(56) References Cited

U.S. PATENT DOCUMENTS

| | | | |
|---|---|---|---|
| 3,494,081 A * | 2/1970 | Taylor et al. .................. 451/45 |
| 3,761,374 A * | 9/1973 | Bromer et al. ......... 204/192.11 |
| 4,083,390 A | 4/1978 | Ingham .................... 144/136 R |
| 4,097,064 A | 6/1978 | Ikawa et al. ................. 280/732 |
| 4,524,894 A | 6/1985 | Leblond .......................... 225/2 |
| 4,805,390 A | 2/1989 | Majkrzak ...................... 56/300 |
| 5,072,967 A | 12/1991 | Batchelder et al. ......... 280/732 |
| 5,082,310 A | 1/1992 | Bauer .......................... 280/732 |
| 5,180,187 A | 1/1993 | Muller et al. ................ 280/732 |
| 5,217,244 A | 6/1993 | Bauer .......................... 280/728 |
| 5,316,822 A | 5/1994 | Nishijima et al. ........... 428/138 |
| 5,348,339 A | 9/1994 | Turner ................... 280/728 B |
| 5,632,914 A | 5/1997 | Hagenow et al. ....... 219/121.71 |
| 5,803,489 A | 9/1998 | Nusshor ................... 280/728.3 |
| 5,863,064 A | 1/1999 | Rheinlander et al. ....... 280/732 |
| 5,961,143 A | 10/1999 | Hlywka et al. .......... 280/728.3 |
| 5,968,381 A | 10/1999 | Nusshor ................ 219/121.69 |
| 6,050,594 A | 4/2000 | Budnick .................. 280/728.3 |
| 6,070,901 A | 6/2000 | Hazell et al. ............ 280/728.3 |
| 6,308,391 B1 | 10/2001 | Blaimschein et al. ......... 29/412 |
| 6,612,607 B1 * | 9/2003 | Takahashi ................ 280/728.3 |
| 6,692,019 B1 * | 2/2004 | Sommer ....................... 280/732 |
| 2002/0014764 A1 | 2/2002 | Anglsperger ............. 280/743.1 |
| 2002/0078814 A1 | 6/2002 | Kansteiner et al. ........... 83/875 |
| 2002/0104331 A1 | 8/2002 | Fukuyama et al. ............ 65/61 |
| 2003/0066586 A1 | 4/2003 | Blockhaus et al. ........... 156/78 |
| 2003/0124295 A1 | 7/2003 | Gundlach et al. ............. 428/43 |

FOREIGN PATENT DOCUMENTS

| | | |
|---|---|---|
| DE | 4409405 | 9/1994 |
| DE | 198 55 803 A1 | 6/2000 |
| EP | 0 595 374 B1 | 2/1998 |

(Continued)

*Primary Examiner*—David R. Dunn
(74) *Attorney, Agent, or Firm*—Grossman, Tucker, Perreault & Pfleger PLLC

(57) ABSTRACT

The present invention relates to the formation of a double angle V-groove in the backside of plastic shells to provide a preweakened section for a vehicle application. The double angle V-groove may be located at the airbag deployment opening of a vehicle.

5 Claims, 2 Drawing Sheets

FOREIGN PATENT DOCUMENTS

| | | |
|---|---|---|
| EP | 0 967 066 A3 | 4/2001 |
| EP | 1 177 878 A1 | 2/2002 |
| EP | 1 219 405 A1 | 7/2002 |
| GB | 2276354 A | 9/1994 |
| JP | 6-218811 A2 | 9/1994 |

* cited by examiner

ULTRASONIC BLADE DESIGN FOR SCORING DOUBLE ANGLE GROOVE AND PRODUCTS THEREFROM

CROSS-REFERENCE TO RELATED APPLICATIONS

This application claims priority to U.S. Provisional Application Ser. No. 60/411,458, filed Sep. 17, 2002, and is herein incorporated by reference.

FIELD OF THE INVENTION

The present invention relates to a method for scoring double-angle weakening grooves in skin material and products produced therefrom. The invention has particular utility in the field of automotive applications, specifically, the backside of skin sections covering airbag deployment systems

BACKGROUND OF THE INVENTION

A common type of interior trim panel 2 (FIG. 4) or cover 20 used to cover and hide the air bag 40 (FIG. 5) in a motor vehicle may comprise a thin elastic plastic outer skin 22 having a non-glaring grained outer surface, a rigid retainer or substrate 26 and an intermediate layer of soft plastic foam 24 between the skin and substrate. In some cases the foam is omitted.

It is common practice to use vinyl, typically polyvinyl chloride (PVC), to form the thin plastic outer shell or skin 22 for the panel 2. The skin material may also comprise urethanes (e.g., PU), olefins (e.g., PP, PS, TPO, ETP-TPO), esters (e.g., COPE), styrenes (e.g., AAS, ASA) and rubbers (e.g. TPO, ETP-TPO, ABS) in various compositions.

The present invention relates to those trim panels 2 or covers 20 wherein the skin 22 is formed of a thermoplastic polymer or thermosetting resin and is provided with an invisible tear seam 30, and the substrate 26 includes one or more doors 29 that are impacted by the inflating air bag and press against the cover to separate the tear seam 30 and then swing outward to form an opening in the cover 20 for deployment of the air bag 40 into a protective position in the passenger space. These tear seams 30 are provided in various configurations or patterns with the most common having a C, H, U, or X-shape and wherein the pattern determines the number of doors required in the substrate.

To develop tearing and/or breaking, air bag doors 29 that are integrally formed with automotive trim or instrument panels 2 will sometimes include regions of weakened materials, reduced thickness or scoring, all of which are commonly referred to as "tear seams" 30. Tear seams are weakened areas designed to preferentially tear and/or break when an air bag inflates and forces the doors to open.

It is desirable that the tear seams 30 and thereby the presence of the air bag 40 be hidden from view for various reasons and heretofore, this has been accomplished in several different ways. Such a tear seam is commonly referred to as an "invisible tear seam". One way of providing such an invisible tear seam 30 is by forming a tear seam defining groove 32 or series of depressions in the backside of the skin. This leaves a thin and thereby weakened section at the outer or appearance side of the skin that defines the tear seam 30 without outwardly revealing its presence during normal view by an ordinary vehicle occupant. Examples of such invisible air bag cover tear seams are disclosed in U.S. Pat. Nos. 5,072,967; 5,082,310; 5,316,822; 5,348,339; 5,632,914; 5,863,064 and 5,961,143.

A variety of disclosures exist directed at preweakening a skin section employed in an automotive airbag deployment system.

U.S. Pat. Nos. 4,524,894 and 4,805,390 are directed at the use of an apparatus for cutting patterns and a groove cutting machine to provide a constant thickness of material remaining after the cutting process.

U.S. Pat. Nos. 5,803,489 and 5,968,381 are directed to an air bag cover with a tear line with a predetermined wall thickness which tapers from the inside towards the outside with a width of 120–190 microns.

U.S. Pat. No. 6,308,391 discloses a method of producing V-shaped grooves machines in the surface of different materials. The V-shaped grooves have a predetermined depth relative to the surface. The V-shaped grooves are of a single angle.

Other background disclosures include U.S. application Ser. Nos. 10/027,779; 09/778,394; 10/251,897; 10/241,366; GB 2,276,354; JP 6218811; and EP 1177878.

When soft plastic or elastomeric skin materials are used as a cover skin for an air bag deployment system, it is not uncommon for the skin material that forms the invisible tear seam in the backside of the cover skin to heal or stick together if an insufficient amount of material is not removed when the tear seam is formed. Thus, the angle of the side walls of the seam is critical. Additionally, some higher powered laser weakening systems may cause degradation of the skin surface where it has been thinned or weakened, resulting in a tear seam that remains tacky. A further issue with these systems is the smoke produced, making the work area quite unpleasant.

An alternate method to laser weakening involves the use of a knife-blade which may score the backside of the cover skin to a known depth, thus providing a line of mechanical weakness or tear seam. The knife blade may be heated or excited by another source of energy such as ultrasonics to provide a reliable cut or scoring line. The scoring need not be a continuous groove but may be intermittent and vary in depth dependent on where the tearing of the seam is desired to initiate and propagate.

It is therefore desirable to provide a knife-blade design that prevents healing of the tear seam, particularly for soft elastomeric skin materials.

SUMMARY OF THE INVENTION

The present invention relates to a blade design for scoring double angle V-grooves in the backside of plastic shells to provide a preweakened section. The double angle V-groove may be located at the airbag deployment opening of a vehicle.

It is therefore an object of the present invention to provide a knife-blade having a double angle design which allows for the removal of sufficient material from the tear seam to prevent healing of the sides of the groove back together.

It is a further object of the present invention to provide a double angle knife-blade which provides an invisible tear seam by removing a portion of the skin material at an angle that prevents healing while leaving sufficient material remaining at the base of the groove or tear seam such that readout on the front side of the skin is prevented.

It is a further object of the present invention to provide a knife blade design which can be used on both freshly molded as well as aged shells and allow scoring at a reasonably high rate of speed.

DETAILED DESCRIPTION OF THE PREFERRED EMBODIMENTS

Figure 1:
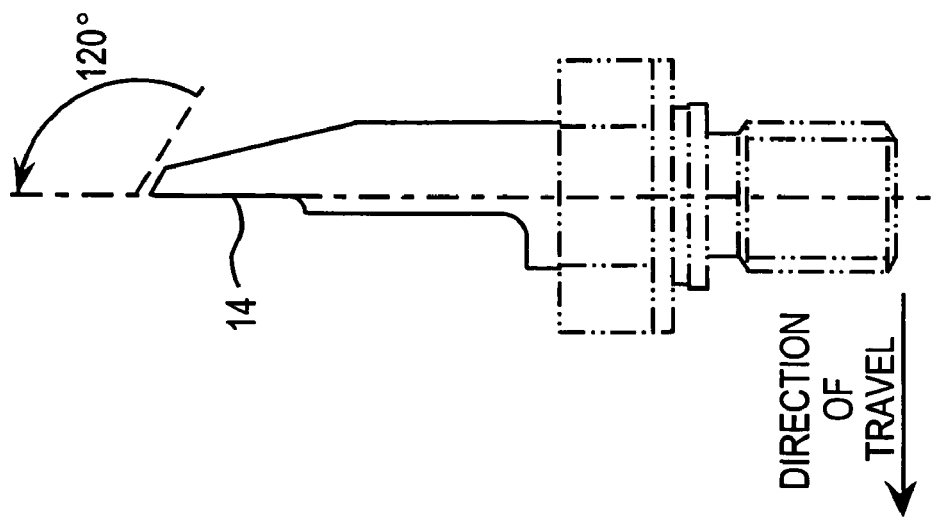
FIG. 1 is a side view of the preferred ultrasonic knife blade used in the present invention.
Figure 4:
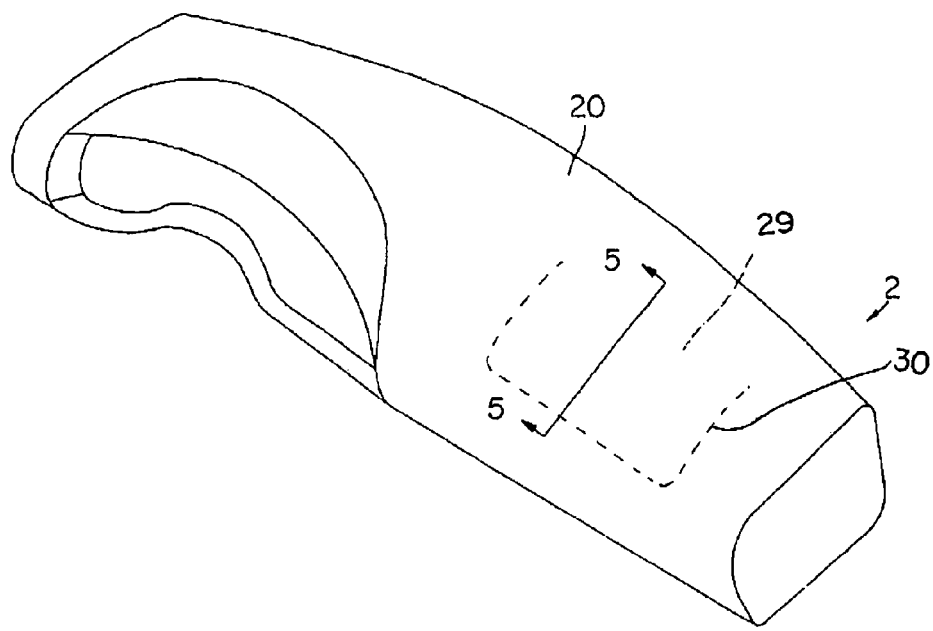
FIG. 4 is a perspective view of an exemplary instrument panel having a hidden airbag system.
Figure 5:
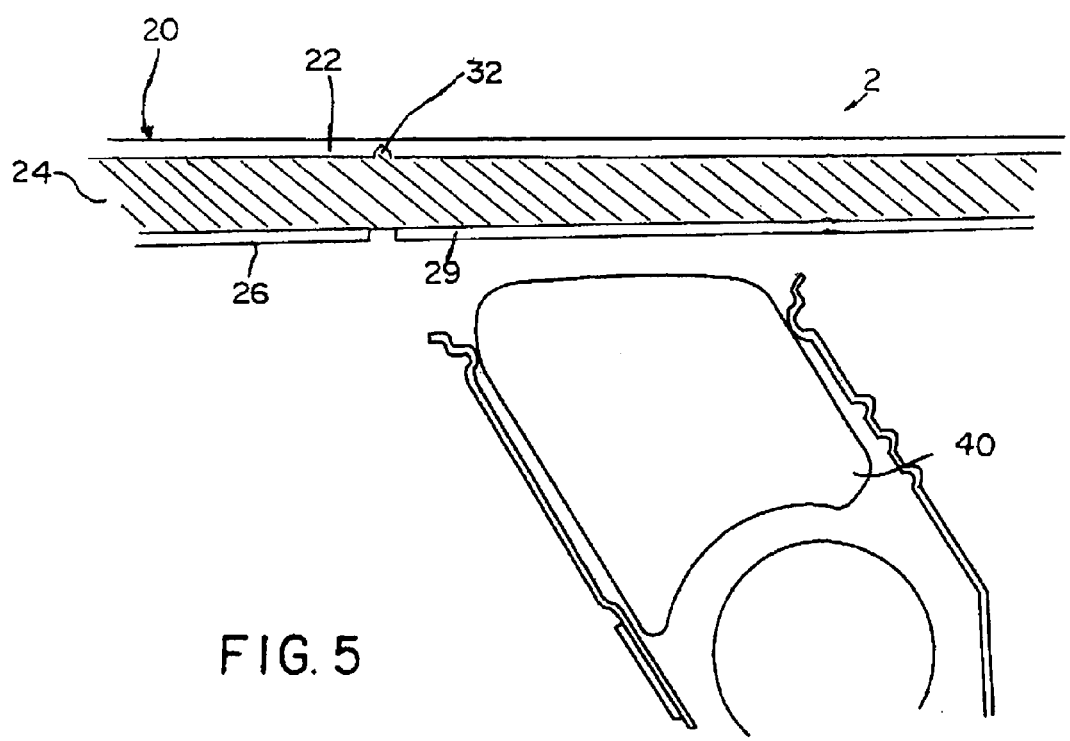
FIG. 5 is a cross-sectional view of FIG. 4 taken along lines 5—5.

FIG. 1 illustrates a side view of the preferred ultrasonic blade that can be used in accordance with the present invention. However, it should be appreciated that in broad context, any blade that operates to provide the V-shaped groove 32 described herein is contemplated.

Figure 3:
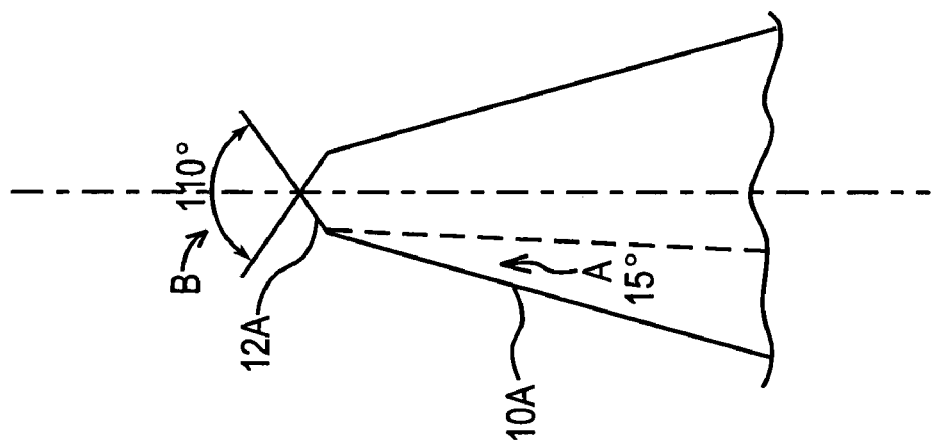
FIG. 3 is an enlarged view of the knife blade tip of FIGS. 1 and 2.
Figure 2:
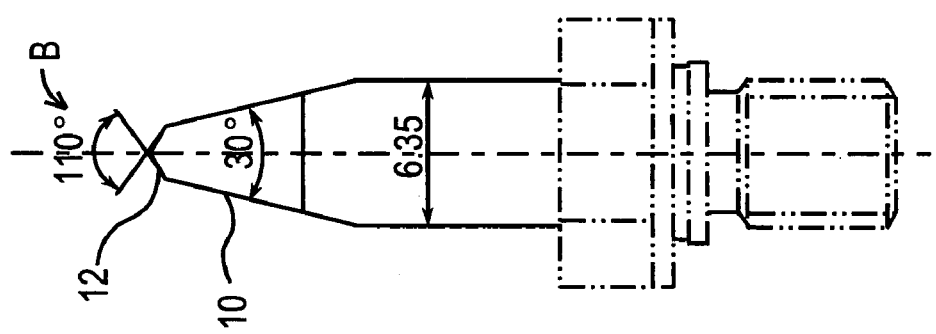
FIG. 2 is a front view of the knife blade of FIG. 1.

With attention directed to FIG. 2, as illustrated therein the blade contains a double angle V-shaped configuration. Shown at 10 is the first angle cutting surface A which angle is less than the angle of cutting surface B which is shown generally at 12. In the context of the present invention, angle A is preferably between 5–30 degrees and angle B is between 75–150 degrees. In addition it should be understood that the present invention contemplates all values therebetween in one (1) degree increments. More preferred ranges therefore include angle A of 10–20 degrees and angle B of 90–130 degrees. In a most preferred embodiment, angle A is about 15 degrees and angle B is about 110 degrees. Attention is directed to FIG. 3 which illustrates angle A of 15 degrees and angle of B of 110 degrees.

It has been found that the above referenced double angle V-shaped design minimizes the weakening line visibility produced therefrom, enhances deployability, while preventing blocking of the skin material 22. In other words, the skin material is not prone to heal to itself after the cutting operation, by virtue of the double angle configuration.

Preferably, the skin material 22 comprises a thermoplastic polymer, such as poly(vinyl chloride) or polyurethane, thermoplastic elastomers, thermoplastic olefins, and other skin materials utilized for vehicle interiors. Preferably the blade has a flat front edge (14) as shown in FIG. 1 which also indicates generally the path of knife travel.

Preferably the groove 32 is 0.045" wide at the top with 0.020" –0.028" of material at the bottom thereof.

What is claimed is:

1. An instrument panel for the interior of a vehicle passenger compartment equipped with an inflatable airbag device adapted to be deployed into a passenger space in said passenger compartment, said instrument panel including a covering having an outer surface exposed to view and a knife-cut weakening groove in said covering located beneath the outer surface for weakening the instrument panel in the form of at least a portion of an opening at said location of said airbag device, said weakening groove comprising a V-shaped configuration, wherein said V-shaped configuration comprises the following general shape:

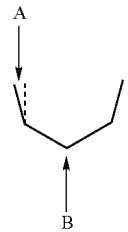

wherein angle A is less than angle B and wherein said weakening groove has sides and said V-shaped configuration prevents healing of said sides back together.

2. The instrument panel of claim 1, wherein angle A is between 5–30 degrees and angle B is between 75–150 degrees.

3. The instrument panel of claim 1 wherein angle A is 10–20 degrees and angle B is between 90–130 degrees.

4. The instrument panel of claim 1 wherein angle A is 15 degrees and angle B is 110 degrees.

5. A cover skin for a component of the interior of a vehicle passenger compartment equipped with an inflatable airbag device adapted to be deployed into a passenger space in said passenger compartment, said cover skin having an outer surface exposed to view and a knife-cut weakening groove in the cover skin located beneath the outer surface for weakening the cover skin in the form of at least a portion of an opening at said location of said airbag device, said weakening groove comprising a V-shaped configuration, wherein said V-shaped configuration comprises the following general shape:

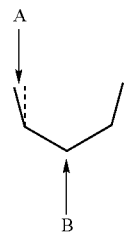

wherein angle A is less than angle B and wherein said weakening groove has sides and said V-shaped configuration prevents healing of said sides back together.

* * * * *